US010080696B2

(12) United States Patent
Oginski et al.

(10) Patent No.: US 10,080,696 B2
(45) Date of Patent: Sep. 25, 2018

(54) SECURING ELEMENT FOR STAND DEVICE AND CORRESPONDINGLY FORMED COMPONENTS

(71) Applicant: Ondal Medical Systems GmbH, Hünfeld (DE)

(72) Inventors: Stefan Oginski, Fulda (DE); Markus Höser, Tann (DE); Andreas Göbel, Eiterfeld (DE)

(73) Assignee: Ondal Medical Systems GmbH, Hünfeld (DE)

( * ) Notice: Subject to any disclaimer, the term of this patent is extended or adjusted under 35 U.S.C. 154(b) by 0 days.

(21) Appl. No.: 15/517,384

(22) PCT Filed: Oct. 19, 2015

(86) PCT No.: PCT/EP2015/002060
§ 371 (c)(1),
(2) Date: Apr. 6, 2017

(87) PCT Pub. No.: WO2016/058705
PCT Pub. Date: Apr. 21, 2016

(65) Prior Publication Data
US 2017/0290725 A1  Oct. 12, 2017

(30) Foreign Application Priority Data
Oct. 17, 2014  (EP) .................................... 14003554

(51) Int. Cl.
*E04G 3/00* (2006.01)
*A61G 13/10* (2006.01)
(Continued)

(52) U.S. Cl.
CPC ......... *A61G 13/107* (2013.01); *A61G 12/002* (2013.01); *F16B 21/165* (2013.01);
(Continued)

(58) Field of Classification Search
USPC ... 248/276.1, 282.1, 283.1, 289.11, 324, 327
See application file for complete search history.

(56) References Cited

U.S. PATENT DOCUMENTS

| 2,795,859 | A | * | 6/1957 | Buschbach | G01B 5/255 248/188.1 |
| 4,687,167 | A | * | 8/1987 | Skalka | A47B 21/0314 108/103 |

(Continued)

FOREIGN PATENT DOCUMENTS

| CA | 1 145-736 A | 5/1983 |
| DE | 20 2008 012 151 U1 | 12/2008 |
| EP | 0 496 191 A1 | 7/1992 |

*Primary Examiner* — Terrell L McKinnon
*Assistant Examiner* — Michael D McDuffie
(74) *Attorney, Agent, or Firm* — Seed IP Law Group LLP

(57) ABSTRACT

A securing element for securing a spindle in a bushing, in particular for a medical stand device, includes a supporting portion configured to arrange the securing element in a predefined axial position on a supporting apparatus of the stand device, and an engagement portion configured to interact with a spindle rotatably supportable about an axis of rotation in the supporting apparatus, or a pin of the stand device, to secure the spindle or pin in a predefined axial position relative to the supporting apparatus rotatably within the supporting apparatus. The securing element can be supported in at least one radial position on the supporting apparatus, in particular in a mounting preparation position and/or a securing position, wherein the engagement portion is configured to interact with the spindle or the pin by engagement in the radial direction, in particular in the securing position. The securing element may also be secured in several radial positions and comprise coupling portions that are formed correspondingly. Also disclosed are components correspondingly formed to the securing element, in particular a supporting apparatus, a cover for the supporting (Continued)

apparatus, and a coupling element; and a securing system, or a securing mechanism, or a mounting set each comprising at least one securing element according to the invention.

34 Claims, 9 Drawing Sheets

(51) Int. Cl.
  *A61G 12/00*   (2006.01)
  *F16M 11/08*   (2006.01)
  *F16B 21/16*   (2006.01)
  *F16C 11/10*   (2006.01)
  *F16C 11/04*   (2006.01)

(52) U.S. Cl.
  CPC ............ *F16C 11/103* (2013.01); *F16M 11/08* (2013.01); *F16B 21/16* (2013.01); *F16C 11/04* (2013.01)

(56) References Cited

U.S. PATENT DOCUMENTS

| | | | |
|---|---|---|---|
| 5,704,100 A | 1/1998 | Swan | |
| 6,095,468 A * | 8/2000 | Chirico | F16M 11/2014 248/125.7 |
| 6,639,623 B2 * | 10/2003 | Howell | E04B 9/006 348/370 |
| 6,779,767 B2 * | 8/2004 | Kuhn | F16M 11/08 248/276.1 |
| 7,097,145 B2 * | 8/2006 | Turner | F16M 11/10 248/274.1 |
| 8,196,883 B2 * | 6/2012 | Hirschhorn | F16M 11/041 248/274.1 |
| 8,197,154 B2 * | 6/2012 | Broering | F21V 21/28 248/274.1 |
| 8,276,867 B2 * | 10/2012 | Hung | F16M 11/08 248/274.1 |
| 8,876,075 B2 * | 11/2014 | Diez | F16M 11/2014 248/274.1 |
| 9,022,339 B2 * | 5/2015 | Borg | H02G 7/05 248/323 |
| 9,239,127 B2 * | 1/2016 | Kronung | F16C 11/10 |
| 2003/0052245 A1 * | 3/2003 | McKeown | G05G 5/12 248/276.1 |
| 2009/0213596 A1 * | 8/2009 | Gull | F16M 11/08 362/382 |
| 2015/0316200 A1 * | 11/2015 | Hoshi | F16M 13/022 248/289.11 |

* cited by examiner

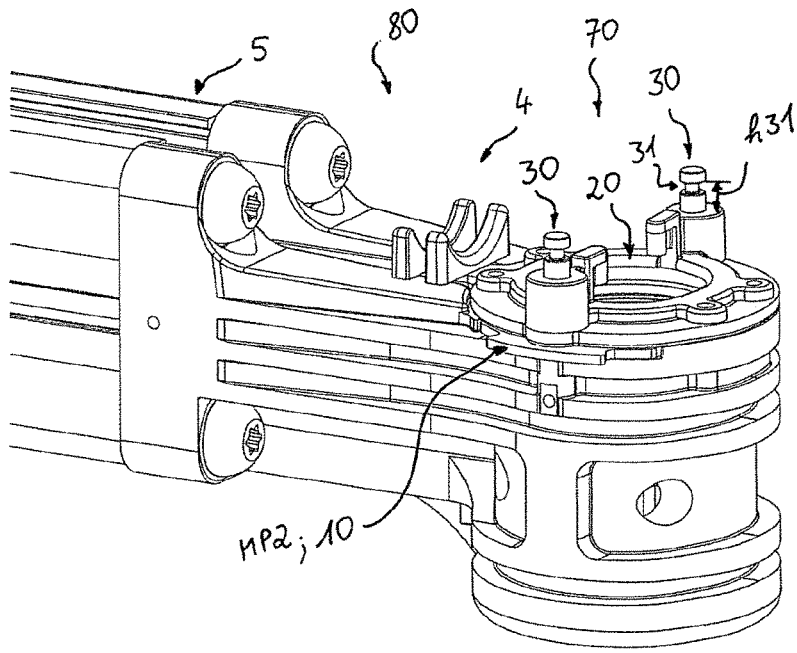
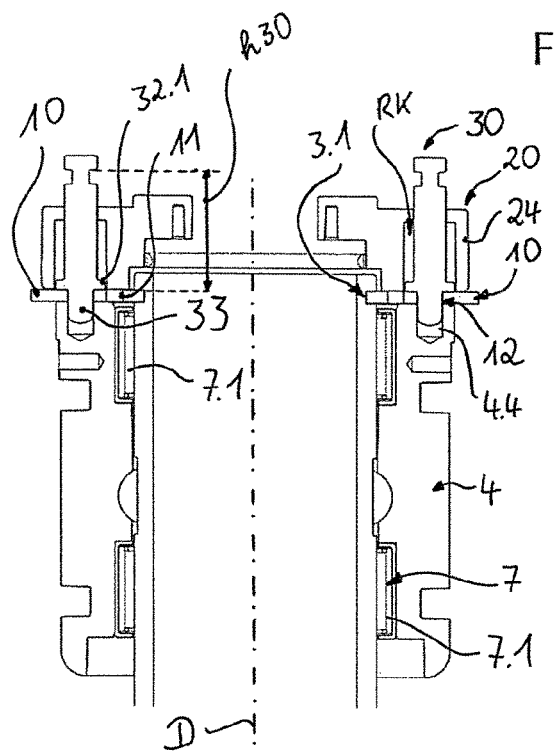
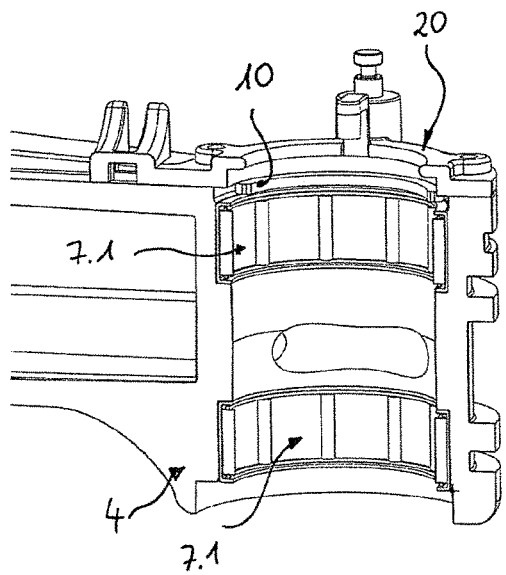
Fig. 6A
Fig. 6B Fig. 6C

SECURING ELEMENT FOR STAND DEVICE AND CORRESPONDINGLY FORMED COMPONENTS

BACKGROUND

Technical Field

The present invention relates to a securing element for securing a spindle to a supporting apparatus, in particular a bushing, wherein the securing element may be secured in at least one radial position and comprises at least one correspondingly formed coupling portion. The present invention further relates to components formed to correspond to the securing element, in particular a bushing, a cover for the bushing and a coupling element. Last but not least, the present invention relates to a securing system or a securing mechanism or a mounting set each comprising at least one securing element according to the invention, and a respective stand device.

In particular, the present invention relates to a securing element with single features of claim 1, as well as to the cover, the securing system, the bushing, the mounting set, and the stand device comprising single features of the respective independent claim, respectively, as well as the usage of such a securing element or one of these components on a stand device, in particular in an operating room.

Description of the Related Art

Stands, in particular, ceiling stands, as for example, ceiling supply units, monitor supports, or so-called spring arms or central axes, usually comprise one or more carriers arranged rigidly or in a way to be adjustable in height regarding a vertical position, by means of which an attached medical device may be moved and positioned, for example, in an operating room, in particular, also in an intensive care unit. On the stands supply units are usually attached, on which medical-electrical devices are arranged, for example, which will be supplied with the required media during surgery, for example. The carriers or supply units are usually supported to be rotatably and/or vertically adjustable and/or vertically pivotable around an at least approximately horizontally aligned axis. Depending on the function or design, the carriers may also be denoted as cantilevers, carrier arms or spring arms.

For such stands a simple mounting and/or a secure connection between individual carrier arms or on an interface to the supply unit are desired. It is particularly important to be able to arrange, support, and/or secure a carrier arm in a predefined axial position.

Stands are known for which a securement may be provided by means of a securing ring that is inserted from above in an axial direction or by means of a securing element that is secured by a sleeve against a displacement radially outwards, for example, as will be described briefly in the following.

According to a first variant, carrier arms may be secured by means of a securing ring, for example, that may engage in a groove of a carrier arm pin from above. Here, the securing ring may be held on a front bushing of the carrier arm. Between the securing ring and the bushing a (stainless steel) disk may be arranged in order to prevent jamming of the securing ring during a relative rotational movement of the carrier arm. A radial support of the carrier arm pin may be performed via sliding bearings or roller bearings pressed into the bushing. This kind of securement has the disadvantage that a technician is not able to see the securing ring, in particular on ceiling stands. This results in the risk that only a part of a securing ring may sit in the pin groove, thus the securing ring may become disengaged, which may cause the whole carrier arm to fall down.

According to a second variant, the lacking visibility of the securing ring may be solved in a way that the securing ring is arranged on an additional pipe-like part which radially supports the carrier arm pin. Here, the mounting is performed by screwing the additional pipe-like part onto another pipe-like step of the carrier arm. The additional pipe-like part may be mounted on the carrier arm already on the floor, thus a correct seat of the securing ring may be verified more easily. However, the additional pipe-like part has to be fastened to the (carrier arm) bushing afterwards, which may lead to some design disadvantages. For example, the additional pipe-like part may be adapted as a continuous cast aluminum profile that is screwed on the bushing with two radial screws. However, the load bearing capacity of the connection significantly depends on the thickness of the wall with which the additional pipe-like part is coupled. Stable, resilient solutions are thus costly.

According to a third variant, medical devices are often secured to a carrier arm by a securing element which is inserted in the lateral groove of the bushing and engages under a step on the carrier arm pin. In other words, stands are known where a securing element may be positioned in a predefined radial position and may be secured by means of an additional component, for example a sleeve shiftable in the axial direction. Here, the securing sleeve is pushed over the securing element from above in order to secure the securing element. This kind of securement may be used for a spindle supported in a bushing, for example. However, the usage of a securing element that is secured by a sleeve usually has the disadvantage that the securing element may fall down during mounting. In most cases, mounting is complicated, as the technician has to hold the medical device and also the sleeve and in addition has to insert the securing element at the same time. Thus, more than two hands, or at least two technicians, are required for mounting. In addition, the sleeve covers the securing element, thus a visual examination may not easily be performed.

For stands known in the art, mounting is comparatively complex or requires a very concentrated way of working, in particular not only from one technician, but from several technicians. In all variants described above, a strict mounting order has to be adhered to.

BRIEF SUMMARY

It is an object of the present invention to provide a component, apparatus or arrangement for a stand, in particular a ceiling stand, by means of which a secure (rotational) support of a carrier arm or a medical device on a further carrier arm, in particular on a supporting apparatus, in particular the bushing, may be provided, especially regarding a simple, almost intuitive mounting. In particular, the object is to provide an arrangement or component hereto by means of which the (dis)mounting of a carrier arm or any further component (in particular a medical device) on the carrier arm may be facilitated in a way that the (dis)mounting may be performed faster or in addition only by one person. It may also be an object to provide a device or arrangement by means of which a correct (dis)mounting may be performed easily and a securing function may be inspected in a simple way, in particular also by advantageously arranging individual components of the apparatus for final mounting in relation to one another prior to leaving the factory.

This object is achieved by a securing element for a stand device, in particular for a medical stand device, configured for arrangement in the operating room and for positioning of a medical device, comprising a supporting portion configured to arrange the securing element in a predefined axial position on a supporting apparatus, in particular a bushing of the stand device; and further comprising an engagement portion configured to interact with a spindle rotatably supportable in the supporting apparatus about an axis of rotation, or a pin of the stand device, in order to secure the spindle or pin in a predefined axial position relative to the supporting apparatus rotatably within the supporting apparatus; wherein the securing element is configured to be supported in at least one, preferably at least two, radial positions predefined by the securing element on the supporting apparatus, in particular in a mounting preparation position and/or a securing position, wherein the engagement portion is configured to interact with the spindle or the pin by engagement in the radial direction, in particular in the securing position. The securing element is configured to be arranged in at least one pre-definable radial position and thus to position the engagement portion in a relative radial position. Many of the advantages of the invention may already be achieved with only one predefined radial position. At least two predefined radial positions provide additional advantages, in particular regarding individual mounting steps.

Here, mounting may be performed in a simple and secure way. Further, the support may be secured by a mechanism, which is easily understood. Here, the securing mechanism is built from comparatively simple, easy to operate components. Securement may be performed in particular by a pin or latch or step engaging with the securing element, in particular in the axial direction. The securing element may be operated manually to displace it, in particular by a pressure from outside, from a first into a second radial position.

Thus, the invention is based on the idea to define at least one or two radial positions by the securing element itself. Therefore, the securing element may comprise a defined contour or geometric configuration which corresponds to the contour or geometric configuration of at least one further component of the securing mechanism.

A medical device and/or a further carrier arm may be supported on the spindle or the pin, in particular in a rotatable way.

The mounting preparation position is thus preferably a holding position, in which the securing element is displaceably held on the bushing, in particular without the risk of losing the securing element, as for example during mounting or during transport. The mounting preparation position may allow the release of a securing mechanism to hold the securing element in a particularly easy way. The mounting preparation position may also be denoted as a transport lock position, in particular in case the securing element has to be provided preassembled on a bushing. The securing element may also be preassembled in the mounting preparation position, which eliminates confusion or faulty mounting and reduces the mounting effort. The securing position is preferably a position in which the securing element is fixedly secured to the bushing.

A stand device is thus preferably a device for holding, fixing a position, and/or displacing at least one medical device that for medical purposes may be firmly mounted or positioned on a wall (in a wall bearing), or on a ceiling, or also on a floor of an operating room, or any other room; for example, a ceiling stand. The stand device thus may not be moved in a completely unrestricted way in the operating room, but may only be moved within a certain radius of action, in particular, relative to a fastening point or supporting point on a ceiling or a wall of the operating room. The stand device may be configured as a ceiling supply unit mounted on a ceiling, and include one or more supply units supported adjustably in position on one or two carrier arms. The stand device may also be adapted as a monitor support. The stand device may also be adapted as a so-called spring arm, in particular one that is mounted on a wall, and include a light, for example. Thus, a spring arm has a movable mechanism, in particular, one that is adjustable in height, which is capable of supporting a weight at different heights and is manually adjustable by using small operating forces (up to about 50 N). The stand device may also be adapted as a so-called central axis mounted, in particular on a ceiling, and comprise a plurality of carrier systems, each having at least one carrier on which a monitor or a light is mounted, for example. Preferably, the stand device includes at least two carrier arms.

Here, a medical device is preferably a supply unit by means of which the means for treating a patient and/or instruments for a surgeon and/or light, clean air, or other media required in the operating room can be provided. The medical device preferably includes some kind of control panel and/or some kind of display device, for graphically displaying patient data, for example.

A supporting portion is here preferably a region or portion, in particular of the securing element or one of the further components of the securing mechanism, by means of which a positioning and support may be performed in a predefined position, in particular in a predefined axial position. The supporting portion preferably comprises two opposite surface portions, which further preferably are aligned parallel to each other or at least comprise the same contour or geometry. The supporting portion of the one component is thus formed to correspond geometrically to the configuration/contour of the other component that is to be supported.

Preferably, an engagement portion is here a region or portion of the securing element by means of which a first component may engage with a second component to define the position of these components relative to each other, in particular also to lock them. The engagement portion is preferably formed as a protruding rim or protruding step with a predefined minimum extension in the radial direction. The engagement portion preferably includes a front edge that comprises a concave curvature corresponding to an outer diameter of the spindle or the pin (and or a respective groove).

Preferably, the spindle is a shaft or a hollow shaft, which is configured to hold a further carrier arm and to support it at least rotatably.

Preferably, a pin is an at least section-wise rotation-symmetric extension or free end, which is configured to hold a medical device and to support it at least rotatably.

Here, an axial position is preferably a position which specifies a specific arrangement of the spindle along the axis of rotation in relation to the axis of rotation defined by the bushing. For ceiling stands a predefined axial position corresponds to an absolute height position or a relative height position in relation to the respective bushing.

Here, a radial position is preferably a position which specifies a specific arrangement of the securing element in the radial direction in relation to a rotational axis defined by the bushing, in particular in a direction orthogonal to the axial direction or to the axis of rotation.

Here, a mounting preparation position is preferably a position in which the spindle is not yet secured in the axial direction, but may be positioned in the bushing in the axial direction, and in which the securing element is supportable in a way that the securing element may be displaced manually, in particular by applying a pressure in the radial direction. In the mounting preparation position preferably only the securing element itself is secured.

Here, a securing position is preferably a position in which the movement of the securing element is completely locked, and in which the securing element locks an axial movement of the spindle, and thus secures the spindle in the desired axial position.

An operating room may also be an examination room or an intensive care unit, that is a room for performing medical treatments or therapies.

According to an exemplary embodiment the securing element comprises at least one, preferably at least two, coupling sections which define one of the predefined radial positions, respectively. In other words, the coupling sections may be arranged offset to one another in the radial direction corresponding to predefined radial positions. This arrangement enables the simple definition of the radial positions directly on the securing element by engagement in the axial direction.

A coupling portion or a coupling point is preferably a region that is formed in a geometrically specific way, which in particular is configured for form-fitting with the coupling element (in particular locking pin) or for engagement with the securing element in the axial direction. Here, the coupling regions may be arranged in a predefined relation to one another. The coupling portion/point may be formed by an opening, a protrusion, a step, an elevation or undercut, an edge or chamfer or cavity, for example. The coupling element may for example be a locking pin, in particular an elastically presupported locking pin.

A coupling point defining the mounting preparation position is preferably arranged closer to the engagement portion than a coupling point defining the securing position. At least one of the coupling points is preferably formed as a (through-)bore.

Preferably, the coupling portions are adapted for form-fitting and/or force-fitting interaction with a coupling element that may be operated independent of the securing element.

According to an exemplary embodiment the securing element comprises a coupling portion adapted as a (first) recess which defines a/the mounting preparation position, and/or wherein the securing element comprises a coupling portion adapted as a further (second) recess which defines a/the securing position, wherein the further (second) recess is preferably larger than a/the (first) recess. Recesses enable a lock of the securing element in a predefined radial position in a simple and robust way.

Preferably, a recess defining the securing position is arranged radially outwards from a recess defining the mounting preparation position. This enables the engagement of the coupling element in the axial direction and allows the provision of a securing mechanism with a simple design.

Preferably, the securing element comprises recesses adapted as at least two through-bores with different diameters that are arranged in series in the radial direction and which define at least two positions. According to a variant, the recesses are formed as slots or cutouts extending tangentially in the longitudinal direction, which are formed to correspond geometrically to an engagement portion of a coupling element (for example a hook or latch).

According to an exemplary embodiment the securing element comprises at least one coupling portion arranged eccentrically regarding a central longitudinal axis of the securing element or an extension of the securing element in the peripheral direction (orthogonal to the axial direction). This way, the securing element may provide different functions depending on which side of the securing element faces upwards during support on the bushing. In other words, the securing element is preferably side-coded, that is, the securing element provides different functions depending on whether the bushing is supported with an upper side thereof facing upwards or facing downwards. In particular, the side-coding enables a simplified (dis)mounting, especially for at least two securing elements.

According to an exemplary embodiment the securing element comprises a lower side and an upper side which are formed geometrically identical to one another, wherein the securing element is preferably formed in the shape of a plate and/or disk and/or annular segment, in particular with upper and lower sides that are aligned parallel to each other. As both sides are symmetrical, the securing element may be arranged with the upper side or the lower side facing upwards, as this facilitates dismounting in particular. Such a securing element may also be turned around and may be supported on the bushing in an inverted arrangement.

Preferably, the securing element comprises an engagement portion disposed radially inside, which has a curvature radius corresponding to a curvature radius of the spindle. This enables a secure support with comparatively low area forces.

According to an exemplary embodiment the securing element comprises a tab, which is arranged radially outside and opposite to the engagement portion and provides a contact face, in particular to operate the securing element manually in the radial direction to the inside or the outside. Preferably, the tab protrudes radially outwards from the supporting portion. According to a variant, the tab protrudes only in the radial direction, however not in the axial direction.

The securing segment may be punched out of a material strip or may be water jet cut. For the present usage, this kind of material strips may be preferably embodied with a special sliding layer (for example sinter bronze with the plastics POM) on one side, and they may thus also be denoted as sliding strips. The sliding layer may also comprise recesses which may serve as reservoirs for lubricants or fats. Under the sliding layer there is a carrier material, for example a steel sheet. Due to the sliding layer, friction and wear may be kept low. Optionally, the securing element may be fabricated of sheet material from steel, brass or bronze, in particular regarding cost-efficient embodiments.

The securing element may comprise steps, or edges, or rims, from which it may be extracted from a certain mounting position or which may prevent a sliding inwards, that is, a kind of stop. Here, a bent portion/rim, or bent end may also act as stop. Protruding rims may also be provided laterally, that is in a radial extension, in particular for geometries being wider than the corresponding guidance in the bushing, this may prevent that they are inserted too far/deeply.

Apart from the coupling portions described above, the securing element may also comprise additional recesses, undercuts our steps, in particular in a region/area disposed radially outside, for example to facilitate the engagement of the tool with the securing element. According to the invention the usage of a tool to position/arrange the securing element is not required, but in particular dismounting may be facilitated in case a tool may be used to engage optionally with the securing element, in particular when the securing element is jammed or interlocked. Preferably, a further recess of this kind is arranged in the area of a/the tab of the securing element.

The object as described above is also achieved by a cover for a supporting apparatus, in particular for a bushing of a medical stand device for arrangement in the operating room, wherein the cover comprises a supporting portion configured to arrange and hold a securing element, in particular a securing element according to the invention, in a predefined axial position on the supporting apparatus and/or on the cover, in particular on the lower side of the cover, and is configured to guide the securing element in the axial position in the radial direction. Thus, the cover provides a contact surface to support the securing element or is formed to correspond geometrically to the securing element. Preferably, the cover is configured to form a (sliding) bearing for the securing element together with the supporting apparatus. This way, a positioning in different radial positions may be facilitated.

Preferably, the cover is at least approximately annular and comprises an outer contour on the lower side that corresponds to an outer contour of an upper side of the bushing. The cover may also be adapted annular with a passage or cutout disposed at least approximately in the center, through which cables may be fed and routed on the stand, for example.

Preferably, the supporting portion is positioned on the lower side of the cover and is preferably defined by a planar area portion of the lower side. Preferably, at least one step or guiding edge is provided on the supporting portion in the radial direction or orthogonal to the axial direction (corresponding to the axis of rotation defined by the bushing) along which the securing element may be displaced radially.

According to an exemplary embodiment the cover comprises a cup or mandrel in the region of the supporting portion in which a coupling element coupleable with the securing element may be supported, wherein the cup or mandrel are preferably configured to bias the coupling element elastically in the axial direction. Preferably, the coupling element is supported in the cover in such a way that it is configured for a coupling and decoupling (and thus for the respective engagement with the securing element) in the axial direction. Preferably, the coupling element is supported elastically biased in the cover, in particular elastically biased in the axial direction, wherein the coupling element may be accessed from above, in particular to pull it upwards against a biasing force.

Further, recesses may be provided in the cup or mandrel, which enable an enhanced visual inspection of the individual positions in the securing mechanics. This enables an even more simple control by a technician.

According to a variant, the cover does not include a cup or mandrel, wherein the coupling element is not supported in the cover, but on the bushing. This variant also has the benefit, for example, that a design space may be reduced in the axial direction, which may be especially advantageous for ceiling stands in lower rooms.

The object described above is also achieved by a securing system for axial positioning and securing a spindle or a pin on a bushing, in particular in a rotary bearing, of in particular a medical stand device, comprising at least one securing element, in particular a securing element according to the invention, a cover coupleable with the bushing, in particular a cover according to the invention, and at least one coupling element that is supportable on the cover and/or on the bushing, in particular in an elastically biased way, which is formed to correspond geometrically to at least one coupling portion of the securing element for the purpose of form-fitting. Such a securing system or such a securing mechanism enable a simple securement of the securing element in at least one predefinable radial position. This also results in advantages regarding a (dis-)mounting. Preferably, a form-fitting engagement in the axial direction is performed.

Preferably, the cover comprises a supporting portion which is formed to correspond geometrically to a/the supporting portion of the securing element and is configured to guide the securing element in the radial direction and to position and hold it in a predefined axial position in the axial direction. The supporting portion facilitates the exact positioning and alignment of the securing element. In particular, the securing element may remain visible, thus enabling a visual expectation. Here, mounting may be performed without tools, in particular without additional fastening means. A technician may operate the securing element manually, in particular displace it in the radial direction. A sleeve that is displaceable in the axial direction, which might also be fastened, is not required.

According to a variant, the securing element is supported on the cover in the mounting preparation position by means of a coupling element, in particular also in a preassembled state, for example during transport. Here, a coupling element may interact with the securing element in the mounting preparation position at least also in a force-fitting way. In contrast, the coupling element acts in the securing position basically in a form-fitting way, and in addition optionally also in a force-fitting way. Form-fitting in the securing position may provide a high degree of security. The securing element may for example be moved from the mounting preparation position radially inwards into the securing position by applying pressure, without having to operate further components.

According to an exemplary embodiment the securing system provides a self-securing securing mechanism by means of the coupling element and the securing element, in particular based on an elastically biased/biasable arrangement of the coupling element, wherein the securing mechanism may lock the securing element by form-fitting in the axial direction in a predefined radial position, in particular in a/the securing position. This self-securing feature and, in particular also the elastically biased support, not only allows for the enhancement of security, but also to facilitate mounting and to provide a mechanism with a simple design which may easily be inspected.

The securing element may be arranged to be displaceable in the radial direction, in particular at least partly by force-fitting in a further predefinable radial position, in particular in a/the mounting preparation position. This facilitates mounting and enables the setting of a defined securing function of a plurality of securing functions.

The object mentioned above is also achieved by a bushing for a medical stand device, wherein the bushing defines an axis of rotation for a rotational movement of a spindle or a pin of the stand device, wherein the bushing comprises a supporting portion configured to arrange and hold a securing element axially, in particular a securing element according to the invention, in a predefined axial position on the bushing, and configured to guide the securing element in the radial direction at least approximately orthogonal to the axis of rotation, wherein the bushing comprises a coupling point or coupling portion, wherein a coupling element that is coupleable with the securing element may be supported for securing the securing element. By means of the supporting portion the bushing is configured to arrange the securing element in at least one, preferably at least two, predefined radial positions, in particular in a mounting preparation position and in a securing position, preferably in a single unchanged, constant radial direction predefined by the bushing.

In the coupling point or portion the coupling element may be supported in a form-fitting way, for example, by engagement in the axial direction, in particular in case the coupling point is disposed on an upper side of the bushing. For example, the coupling point may also be formed as a rotary or pivot bearing provided on an outer lateral surface of the bushing for a coupling element formed as a latch.

The bushing may also be formed as a carrier arm bushing to support the carrier arm, or as a ("pin") bushing to support the medical device, as for example a monitor or a supply unit.

Preferably, the bushing comprises a rotary bearing including individual support elements for a rotary bearing of the spindle or the pin. The support elements may be formed as bearing rings including rolls or balls, for example, and be mounted on an inner lateral surface of the bushing, for example be pressed into it.

According to an exemplary embodiment the bushing is configured to form a sliding bearing with a cover for the securing element, wherein the bushing preferably comprises a contact surface on an upper side that is formed to correspond geometrically to a lower side of the cover at least in sections, Hereby, a mounting portion or a retainer for the securing element according to the invention may be provided.

Preferably, the coupling element may be supported on/in the cover in a way, in particular elastically biased in a cup or mandrel of the cover, that the coupling element may engage by means of the cover on the upper side of the bushing with the bushing.

According to a variant, the bushing comprises a rotary bearing to support a coupling element (latch, hook), in particular on a lateral face. In other words: the coupling element does not need to be supported in the cover, but may also be supported on the bushing, in particular laterally on an outer lateral surface of the bushing. The rotary bearing may be formed by a blind-bore, for example, in particular to provide it in a simple and cost-efficient way. The rotary bearing may also be described as pivot bearing, in particular in case the coupling element has to be supported pivotably about a pivot angle of for example 10 to 30° only. Preferably, the coupling element is supportable about an axis of rotation/pivot axis, which is aligned in the radial direction orthogonal to the axis of rotation defined by the bushing for a spindle. Preferably, the bushing also comprises fastening means for a force storage, for example for a leg spring, in the area of the support element for the coupling element.

Regardless of whether the coupling element is supported in the cover or on the bushing and regardless of whether the coupling element is supported only translationally in the axial direction or pivotably, the coupling element is preferably supported in the axial direction in an elastically biased way.

The object mentioned above is also solved by a mounting set comprising at least one supporting apparatus, in particular a bushing according to the invention, at least a securing element, in particular a securing element according to the invention, and at least a coupling element, wherein the supporting apparatus comprises a supporting portion configured to arrange and hold the securing element axially in a predefined axial position on the supporting apparatus, wherein at least the securing element and the coupling element are configured to interact to define at least one, preferably at least two, radial positions of the securing element in relation to the supporting apparatus by at least a form-fitting engagement with one another, in particular in a mounting preparation position and/or in a securing position. This results in the previously described advantages.

Preferably, the coupling element may also interact with the bushing at least in a form-fitting way.

The mounting set may further comprise at least a cover, in which the at least one coupling element is supported, in particular elastically biased in the axial direction.

According to a variant, the securing element is supported on the cover in the mounting preparation position by means of the coupling element, in particular also in a preassembled state, for example during transport.

An elastically biased support of the coupling element may facilitate (dis-) mounting. Tools are not necessarily required, neither any fastening means. For example, screws are not necessary at all. Torques or attraction forces from any fastening means have not to be taken into consideration. The elastically biased support enables also a visual inspection and/or an acoustic control, in particular for a snap-in mechanism of locking pins or a latch.

A manual displacement of the coupling element against the biasing force may release the securing element again, thus the securing element may be removed manually or may be positioned in another of the predefined radial positions.

According to a variant, the securing element is supported on the cover in the mounting preparation position by means of the coupling element, in particular also in a preassembled state, for example during transport.

Preferably, the coupling element, the securing element, the cover and/or the bushing are configured to support the securing element in the mounting preparation position at least also in a force-fitting way and to support it in the securing position basically in a form-fitting way.

By means of the force-fit in the mounting preparation position/transport lock position a biasing force applied on the securing element may be provided, in particular a biasing force in the axial direction, wherein the force-fit may also be provided in a way that a form-fit is not required or is only available in combination with a force-fit. A form-fit, which may additionally be present, does not lock the securing element. A force-fit support in the mounting preparation position enables a simple operation of the securing element. In particular, only a minimum force has to be overcome to shift the securing element radially into the securing position, which may be executed using one hand.

The form-fit in the securing position may provide a high degree of security, and this is independent of the biasing force of any elastic force storage. The form-fit locks the securing element. Here, a force-fit is no longer necessarily required. Although the coupling element may also be elastically biased in the securing position, but the coupling element does not necessarily apply a biasing force on the securing element.

The object described above is also achieved by a stand device, in particular medical stand device for arrangement in the operating room, including at least one securing element according to the invention, further comprising at least one bushing and at least one spindle or pin rotatably supported in the bushing for supporting a medical device and/or a carrier arm of the stand device, respectively, wherein the spindle and/or the pin are secured by means of the (respective) securing element in a predefined axial position relative to the bushing, and wherein the securing element is secured in a predefined radial position by means of at least one coupling element supported on the bushing and/or supported on a cover mounted on the bushing, which engages in the axial direction with the securing element in a form-fitting way.

Here, the stand device is preferably also configured to displace, in particular in the horizontal and also in the vertical direction, a medical device in the operating room. In addition, the stand device may comprise one or more of any further components described above, in particular at least a/the cover and at least a coupling element that is supported in an elastically biased way.

The stand device may further comprise, in particular: a carrier system comprising a supporting apparatus to fix the position of the stand device in an operating room, in particular on a ceiling, and at least one medical device that is movably supported in a bearing and/or joint, in particular rotary joint, in relation to the at least one carrier arm.

Preferably the stand device is configured to position a medical device in the operating room by a rotational movement about an at least approximately vertically aligned axis, and optionally also by a translational movement in a direction parallel to the vertical axis and/or by a pivotal movement that alters a height position.

Preferably, the stand device comprises a casing that is mountable depending on a securing state. This allows for a self-control dependent on the securing state. A technician is prevented from mounting the casing in case the spindle or the pin is not secured in the correct way. Hereto, the stand device preferably comprises at least one coupling element that comprises a fastening portion arranged on the coupling element in a predefined position that is configured for coupling to the fastening means of a casing. The fastening portion and the fastening means are formed to correspond geometrically to one another and are adapted for mutual form-fitting, for example.

Preferably, the stand device comprises a casing, in particular one or more casing parts which include fastening means (for example a rip, a hook, a clip, a clamp, a latching tab) arranged in a predefined (height or axial) position. By means of the coupling element and the fastening means a position-related coupling may be defined, which is only coupleable in case the coupling element is arranged at a predefined height position, in particular a height position corresponding to an engagement position of the coupling element in the bushing. In other words: the casing is only mountable in case a radial position (preferably the securing position) of the securing element is secured by means of the coupling element.

The object mentioned above is also achieved by using a securing element on a bushing to secure a spindle or a pin in a predefined axial position on the bushing, in particular on a medical stand device configured for arrangement in the operating room, in particular a securing element according to the invention, wherein the securing element is supportable in a predefined axial position on the bushing in at least one, preferably at least two, different radial positions that may be predefined by using the securing element, and is arranged in one of the radial positions in such a manner that the securing element engages with the spindle or pin in the radial direction and secures the spindle or pin in the axial direction in relation to the bushing. This results in previously explained advantages.

The object mentioned above is also achieved by using a securing element on a bushing as a transport lock and arranged in a predefined radial position, in particular for a medical stand device configured for arrangement in the operating room, in particular a securing element according to the invention, wherein the securing element is arranged on the bushing in a predefined radial position in such a manner, that the securing element does not project beyond the bushing inwards in the radial direction or does not project further than a diameter of a spindle or pin arrangeable in the bushing, wherein the securing element is secured in the radial position by means of a coupling element that is preferably supported in an elastically biased way, in particular by engaging in the axial direction. This results in previously explained advantages.

The object mentioned above is also achieved by using a securing element during (dis-)mounting of a stand device, in particular a medical stand device configured for arrangement in the operating room, in particular a securing element according to the invention, wherein the securing element is positioned successively in at least two different predefined radial positions on a bushing of the stand device and is secured in the respective radial position, in particular during mounting initially in the mounting preparation position disposed radially further outwards, and then in a securing position disposed radially further inwards, or during dismounting initially in an inverted arrangement in a/the securing position and then in a/the mounting preparation position. This results in previously explained advantages.

The object mentioned above is also achieved by using at least two securing elements during dismounting of the stand device, in particular by only one person, preferably at least one securing element according to the invention, wherein initially at least one securing element of the at least two securing elements is arranged in an inverted unsecured arrangement on a bushing of the stand device in a securing position to secure a/the spindle or a/the pin within the bushing, while at least one other secured securing element is removed from a normal, not inverted arrangement in order to subsequently remove the unsecured securing element, in particular by using only one hand. By using at least one securing element in an inverted arrangement it is possible to prevent even for an elastically biased coupling element that the securing element may be removed merely by operation of the coupling element. In addition, the securing element may be pulled radially outwards merely by traction force without having to operate the coupling element.

According to a variant, two securing elements are used that are secured by two mechanism being independent from one another, for example by a first at least form-fitting mechanism and a second at least force-fitting mechanism. This way, security may be improved both for mounting procedures and for support during operation.

BRIEF DESCRIPTION OF THE SEVERAL VIEWS OF THE DRAWINGS

The invention will be explained in greater detail in the following figures based on exemplary embodiments. Here, the variants shown in the respective embodiments may be combined with one another. For example, a coupling element may be supported on the bushing and also on the cover. Illustrated are:

In FIGS. 6A, 6B, 6C in a perspective view, a section view and a partly sectioned perspective view components of a mounting set according to an exemplary embodiment of the invention, in particular the bushing shown in FIGS. 1A, 1B, the cover shown in FIGS. 2A, 2B, two couplings elements shown in FIG. 4, and two securing elements shown in FIGS. 3A or 3B;

When describing the following Figures, for reference numbers that are not explicitly explained in a Figure, reference is made to the other Figures.

DETAILED DESCRIPTION

Figure 1A:
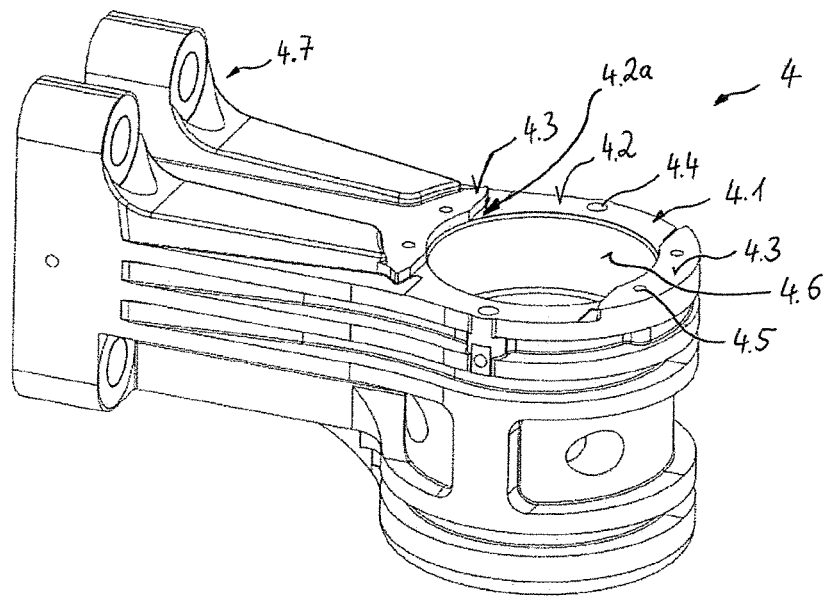
In FIGS. 1A, 1B in a perspective side view and in a plan view a bushing according to an exemplary embodiment of the invention.
Figure 1B:
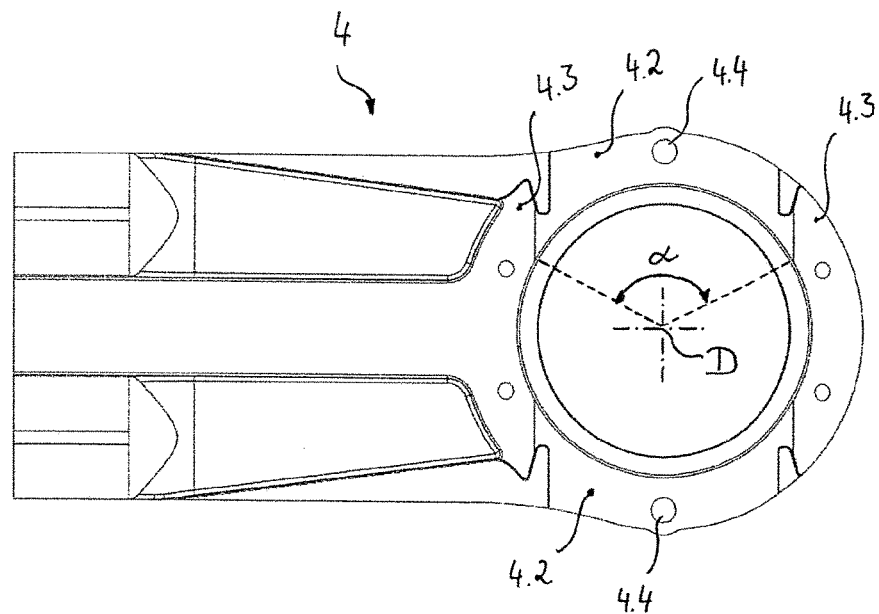

In FIGS. 1A, 1B a bushing 4 is shown which defines an axis of rotation D and provides a rotary bearing for a spindle or a pin. On an upper side the bushing 4 comprises a cutout 4.1, in particular a milled cut, cavity or recess that defines a supporting portion 4.2 or a supporting area for a securing element (see FIGS. 3A, 3B). On the supporting portion 4.2 the securing element is displaceable in the radial direction, in particular in a sliding way, and holdable in the axial direction (relating to the axis of rotation D). The supporting portion 4.2 is configured to accommodate supporting forces applied by the securing element(s) downwards and to transfer them into the bushing 4. The supporting portion 4.2 extends along the complete width of the respective portion of the bushing 4 being annular in this section. In other words: the respective supporting portion 4.2 is formed as an annular segment, at least approximately. Here the supporting portion 4.2 is adjacent to an inner lateral surface 4.6 of the bushing 4, which enables an efficient, advantageous transfer of forces for small lever lengths.

The supporting portion 4.2 extends about an arc having a maximum size, in particular to keep the surface compression or the surface pressure low.

According to a variant, the arc is at least 90°, 100° or 110°, preferably in the range of 120° to 150°, as indicated in FIG. 1B. Further, at the supporting portion 4.2 a coupling 4.4 is provided (here as blind-bore), which is formed to correspond geometrically to a coupling element (see FIG. 4).

Figure 2A:
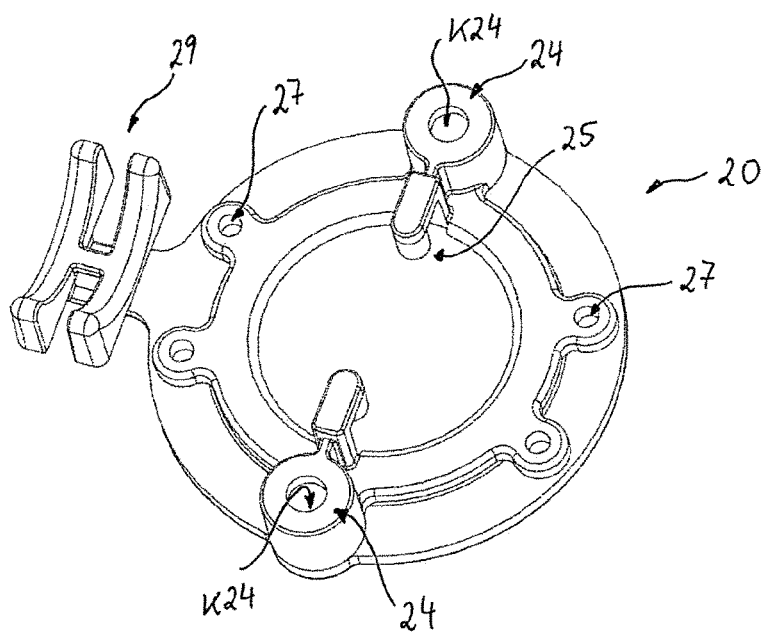
In FIGS. 2A, 2B in two perspective side views a cover according to an exemplary embodiment of the invention for arrangement on the bushing shown in FIGS. 1A, 1B.
Figure 2B:
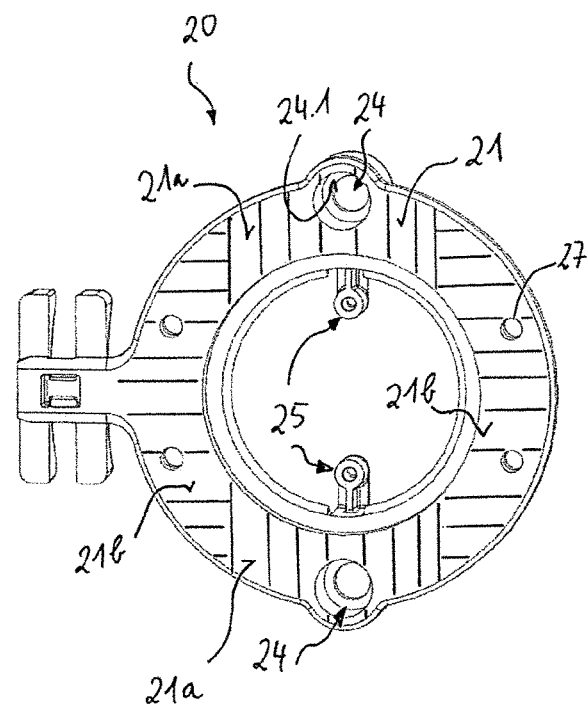

Further, on an upper side of the bushing a contact surface 4.34 for a cover is provided (see FIG. 2A, 2B). The contact surface 4.3 projects beyond the support portion 4.2 and thus forms a step, where the securing element may be adjusted in the center or along which the securing element may be guided in the radial direction.

Further, on the upper side of the bushing fastening means 4.5 (and in particular threaded-bores) are provided, on which a cover may be fastened. By means of the mounting portion 4.7 the bushing 4 may be mounted on a carrier arm, in particular by screwing.

In FIG. 2A, 2B a cover 20 is shown, which has an annular form and is formed to correspond geometrically to the bushing 4, in particular on a lower side 21. The lower side 21 is planar, at least in sections, and comprises supporting surfaces 21a at least in sections corresponding to the securing elements, in particular planar sliding surface portions. In the region of the support surfaces 21a retainers 24 are arranged as a kind of cup or mandrel, respectively, wherein each retainer 24 defines a cavity K24 to accommodate a coupling element (see FIG. 4). Each recess 24 comprises a step 24.1 on which a force storage (not shown), for example a compression spring that may be biased elastically, may be held. Such a force storage may bias the coupling element and position it independently, in particular engage it with a respective coupling 4.4 on the bushing 4.

The lower side 21 further comprises support surface portions 21b in at least portions that correspond to contact surfaces 4.3 of the bushing 4. The contact surface portions 21B are preferably arranged opposite to and sandwiched between the supporting surfaces 21a, respectively.

On the cover 20 fastening means 27 are provided (in particular through-bores) on which the cover 20 may be fastened to the bushing 4. All fastening means 27 are disposed in the respective contact surface portion 21b, which ensures a direct force transfer and/or precise alignment of the cover, whereby last but not least, also said securing elements may be supported or held in a precise manner.

The cover 20 further comprises two radial protrusions 25 arranged opposite each other in the region of the retainer 24. The radial protrusions may be used to tighten a part of an electric plug-in coupling. A cable retainer 29, which projects as a kind of a protrusion pointing radially outwards from the annular portion of the cover, enables a support of cables or lines which have to be routed within the bushing.

Figure 3A:
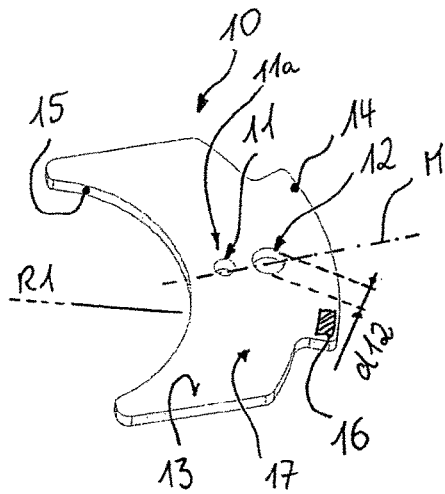
In FIGS. 3A, 3B, 3C in a perspective side view, respectively, a securing element according to an exemplary embodiment of the invention for arrangement on the bushing shown in FIGS. 1A, 1B or the cover shown in FIGS. 1A, 1B.
Figure 3B:
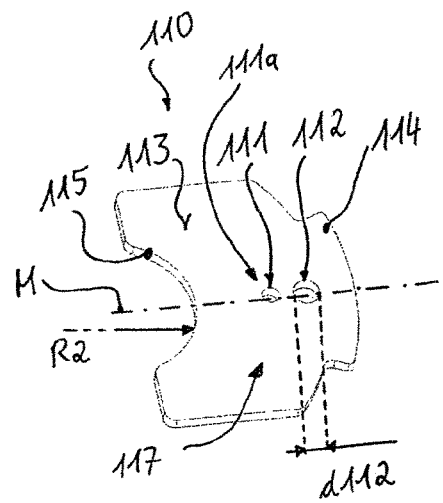

In FIGS. 3A, 3B a securing element 10; 110 is shown, which comprises a first coupling portion 11; 111 and a second coupling portion 12; 112, respectively. The second coupling portion 12; 112 is larger than the first coupling portion 11; 111, and has a diameter d12; d112. The second coupling portion 12; 112 is disposed radially outside of the first coupling portion 11; 111, in particular centered on a central longitudinal axis M of the respective securing element 10; 110.

Here, the first coupling portion 11; 111 can include or form a transport lock portion 11a; 111a. The transport lock portion 11a; 111a is configured to position and to hold the securing element 10; 110 during transport in a predefined radial position in relation to a cover and/or a bushing. Preferably, the radial position defined by the transport lock portion 11a; 111a corresponds to the mounting preparation position defined by the first coupling portion 11; 111, thus the securing element 10; 110 may be easily be mounted after transport or may easily be arranged in the securing position.

The securing element 10; 110 is formed as a sheet-like segment with opposite support surfaces or sliding faces 13; 113 that are aligned at least approximately parallel to one another. The sliding faces 13; 133 may here define at least partly a supporting portion 17; 117 of the securing element 10; 110. The respective securing element 10; 110 comprises an engagement portion 15; 115, which comprises a curvature or a convex edge with a radius R1; R2 that is specifically adapted to a spindle that is to be secured. The engagement portion 15; 115 is arranged in a region of the securing element 10; 110 disposed radially inwards. By adaption of the radius R1; R2 a suitable securing segment 10; 110 may be provided for a respective spindle in a simple way.

The securing element comprises a tab 14; 114 on an edge disposed radially outside. The tab enables an easy manual operation, for example in a direction radially inwards or outwards.

Regarding the securing element 10 shown in FIG. 3A, for each embodiment of the securing element 10 a further engagement point, recess or cutout 16 is indicated for mounting purposes by way of example, in particular corresponding to a tool geometry. The engagement point or the contact point 16 is preferably disposed in the region of tab 14, that is, radially outside, in particular for the purpose of good accessibility.

Figure 3C:
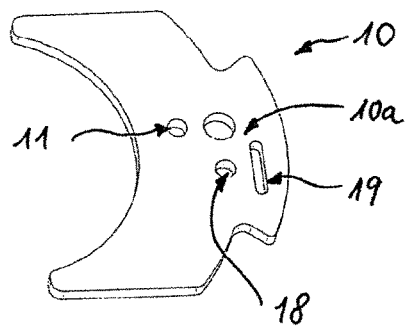

In FIG. 3C a variant of the securing element 10 is shown, where coupling portions are arranged eccentrically. Hereby, a securing element 10 comprises a side coding 10a, so that it includes a predefined upper side and a predefined lower side. A third coupling portion 18 defines a dismounting position, wherein the securing element 10 may be secured during dismounting. A dismounting slot 19 may be used to simplify the removal of the securing element 10, for example by engagement using a screwdriver.

Figure 4:
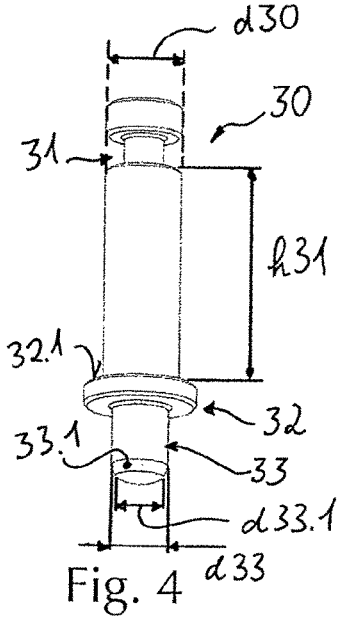
In FIG. 4 in a perspective side view a coupling element for usage on the cover according to an exemplary embodiment of the invention.

In FIG. 4 a coupling element 30 is shown formed as a locking pin, which comprises a diameter d30 on an upper free and or on an operation portion. On the operation portion the locking pin 30 may be operated manually, in particular pulled upwards against a spring force. The lock pins 30 comprises a fastening portion 31 in the upper end region adapted as peripheral groove. This fastening portion 31 is configured to interact with a casing component of a/the stand device, as will be explained in more detail referring to FIGS. 7A, 7B. In the region of an upper end, the securing pin 30 comprises an annular portion 32 including an upper contact surface or a step, on which a force storage, in particular a compression spring, may abut.

Below the angular portion 32 an engagement portion 33 is formed, which is formed to correspond geometrically to the first and also to the second recesses 11; 111; 12; 112 of the securing element. The securing portion 33 comprises a free end 33.1 with a specific geometry, in particular a chamfer, that is dimensioned in a way that the free end 33.1 rests with the chamfer on the first recess 11; 111, however may engage with the second recess 12; 112. In particular, the engagement portion 33 comprises a diameter d33 which is larger than a diameter of the first recess 11; 111, but smaller than or equal to a diameter of the second recess 12; 112. A diameter d33.1 of a free end or of a front face of the chamfer 33.1 is smaller than the diameter of the first recess 11; 111. This configuration enables at least partly an engagement with the first recess or at least a contact in a predefined position on a first recess 11; 111 without locking a displacement of the securing element.

The groove 31 is arranged at a predefined height h31, in particular relating to an annular portion 32 (for example the contact surface 32.1). This height h31 is dimensioned in a way that the securing mechanism may be provided during mounting of a casing.

Figure 5:
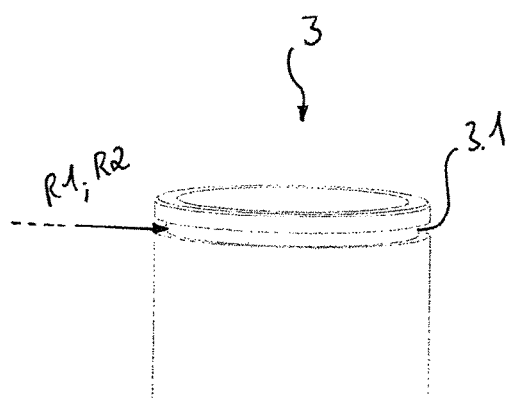
In FIG. 5 in a perspective side view an upper part of a spindle or pin for support in a bushing according to an exemplary embodiment of the invention.

In FIG. 5 a spindle or pin 3 is shown by means of which a carrier arm or a medical device may be supported on a bushing. The spindle 3 comprises a groove 3.1 by means of which the spindle 3 may be secured on the bushing in the axial direction by engaging at least one securing element 10; 110 in the groove 3.1. The groove 3.1 is provided circumferentially and comprises an uniform diameter which may be described by respective radii R1; R2. The radii R1; R2 preferably correspond to those radii of the respective securing element 10; 110 which ensure an engagement along an arc of a maximum size and thus ensures comparatively low surface loads or peak pressures.

In FIGS. 6A, 6B, 6C a mounting set is shown by means of which the mounting of the spindle on the bushing 4 may be facilitated. The securing element 10 is supported between the bushing 4 and the cover 20, wherein a coupling element 30 is supported in the cover 20 for a securing element, respectively, which interacts with the corresponding securing element 10. The securing element 10 is arranged in the securing position MP2. The bushing 4 is already mounted (screwed) on a carrier arm 5, and the coupling elements 30 are in engagement with the respective securing element 10. In other words: the securing elements 10 are arranged in the securing position, and the groove 31 of the respective coupling element 30 defines a fastening means, on which a casing may be mounted. The groove 31 is arranged at the predefined height h31 due to the engagement with the securing element 10. In FIG. 6A components of a securing system 70 are shown, that is the cover 20, securing elements 10 and the coupling elements 30. In addition, components of a mounting set 80, in particular comprising the bushing 4, are shown.

In FIG. 6B is indicated how the securing elements 10 engage with the groove 3.1 of spindle 3, while the securing elements 10 are secured in the securing position by the coupling elements 30, respectively. A force storage (in particular helical springs; not shown) arranged in an annular cavity RK defined by the respective retainer 24 of the cover 20 ensures that the coupling element 30 engages in the bore 4.4 by means of the engagement portion 33, in particular by applying a compression force on the upper contact surface 32.1. The securing position may be identified from the fact that the first recess 11 is arranged radially inwards of the coupling element 30, wherein the engagement portion 33 engages with the second recess 12.

The groove 31 of the coupling element or of the lock pins 30 is arranged at a predefined height h30 in relation to the bushing or the securing element 10, in which the locking pin 30 engages with the bushing 4 in a maximum depth (=target height). In this arrangement of the securing pin(s) 30 final mounting (for example of a casing) may be performed. Within the bushing 4 a rotary joint or rotary bearing 7 is formed, in particular by individual support elements 7.1. In case no securing element 10 is inserted, this groove 31 is positioned at a low height, thus a casing is not able to snap-in and may not be mounted.

As can be seen in FIG. 6C, the securing element 10 may be arranged above a support element 7.1 and may also axially secure the support element 7.1. This also facilitates mounting, in particular as a support element 7.1 may be inserted in the bushing 4 from above and may then be secured by means of the securing element 10 without having to provide further components in the axial direction.

Figure 7A:
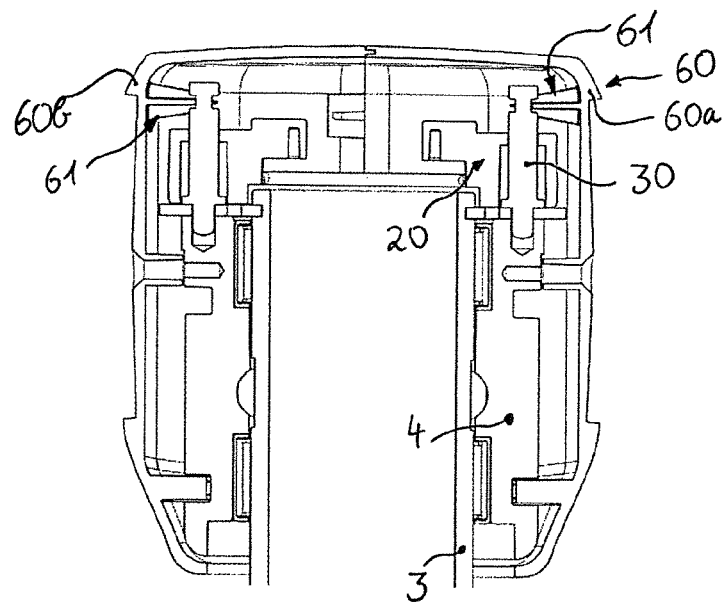
In FIGS. 7A, 7B in a section view and a partly sectioned perspective view components of the stand device according to an exemplary embodiment of the invention, in particular the components shown in FIGS. 6A, 6B, 6C and a casing mounted on the bushing or the coupling elements.
Figure 7B:
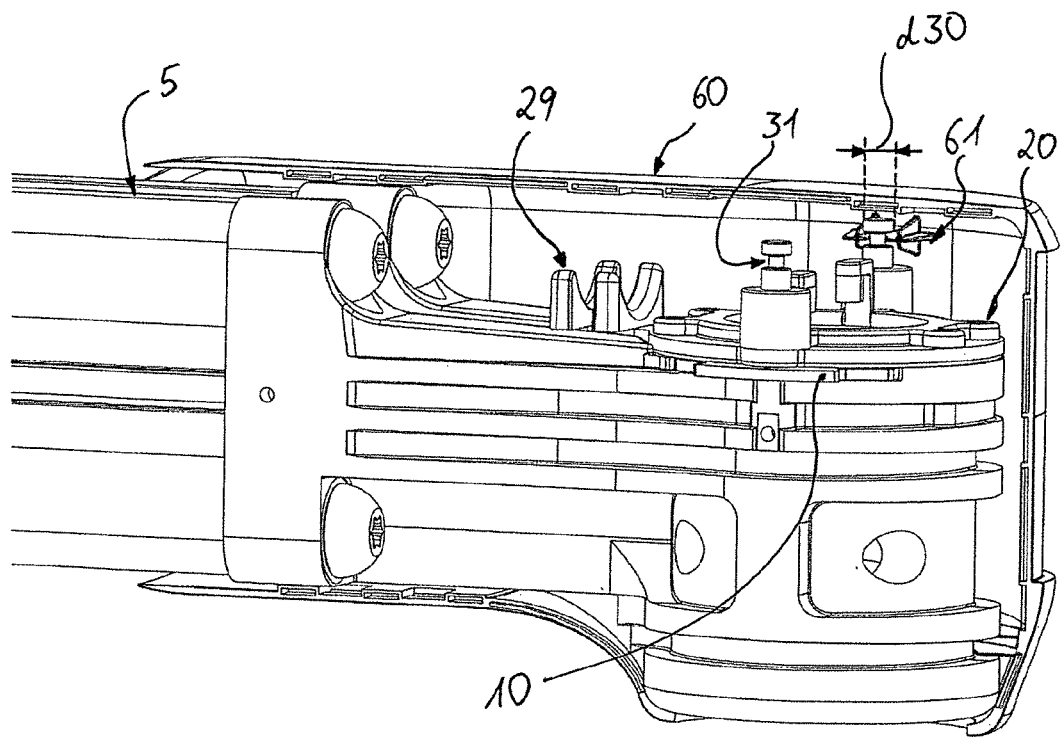

In FIGS. 7A, 7B a further securing function of the coupling element 30 and the securing elements 10 regarding a final mounting is displayed. A technician may mount a casing 60 only, if the securing elements 10 or the coupling elements 30 are arranged in the securing position. The securing elements 10 engage with the spindle 3, and the coupling elements 30 engage both with the securing elements 10 and also the bushing 4.

In this example, the casing 60 is formed from two casing parts/halves 60a, 60b, which comprise one or more fastening means 61, respectively, in particular rips, hooks, engagement means or clamps, which are formed and arranged to correspond geometrically to the fastening portion 31.

Due to the fastening means 61 it may be prevented that the technician completes a mounting of the stand device without securing the spindle 3. Together with the securing elements 10 and the coupling element 30 the fastening means 61 thus provide an even higher security and an even more simplified self-explaining mounting.

In FIG. 7B a possible variant of the fastening means 61 is displayed. The fastening means 61 are formed as crosspiece at least in sections, on which a cutout is provided, which may support the groove 31. The cutouts have smaller dimensions than the diameter d30 of the coupling element 30, thus an engagement is only possible in case the groove 31 is arranged at the height of the crosspiece.

Figure 8:
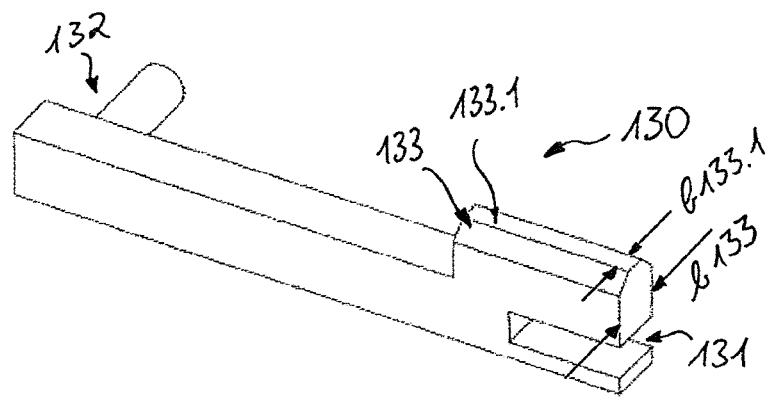
In FIG. 8 in a perspective side view a coupling element for usage on the bushing according to a further exemplary embodiment of the invention.

In FIG. 8 a coupling element 130 is shown according to a further exemplary embodiment, in particular being formed as a latch or hook. The coupling element 130 comprises a fastening portion 131 adapted as a cutout (gap) in a region of a front free end. This fastening portion 131 is configured to interact with a part of the casing of a/the stand device, as will be explained in more detail referring to FIGS. 12A to 12D. In the region of a free rear end, the latch 130 comprises a supporting portion 132 with a protrusion or step by means of which the latch may be supported on the bushing.

Figures 9A, 9B:
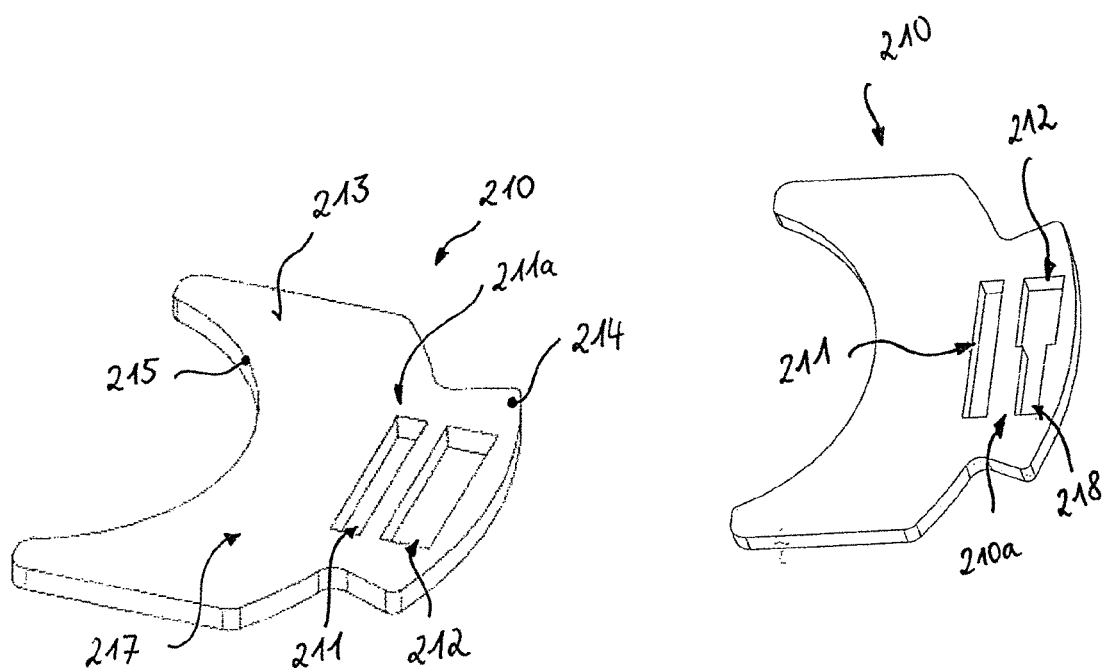
In FIGS. 9A, 9B in a perspective side view, respectively, a securing element according to a further exemplary embodiment of the invention for arrangement on the bushing shown in FIGS. 1A, 1B, or on the cover shown in FIGS. 1A, 1B, or on a cover shown in FIG. 10A.

On the front free end an engagement portion 133 is formed, which is formed to correspond geometrically to the first and also to the second recess 211; 212; of a securing element 210 shown in FIG. 9A. The securing portion 133 comprises a protruding edge or rim 133.1 having a specific geometry, in particular a chamfer extending linearly, which is dimensioned in a way that the rim 133.1 rests with the chamfer on the first recess 211, but may completely engage with the second recess 212. In particular, the engagement portion 133 comprises a width b133 which is larger than a respective width of the first recess 211; but smaller than or equal to a respective width of the second recess 112. A width b133.1 of a front face of the chamfer 133.1 is smaller than a respective width of the first recess 211. This configuration enables at least partly the engagement with the first recess or at least a position-defined resting on a first recess 11; 211 without locking a displacement of the securing element. The securing element may be displaced from such a mounting preparation position into a securing position, in particular by applying pressure from outside.

In FIGS. 9A, 9B a securing element 210 is shown according to a further exemplary embodiment, which comprises a first coupling portion 211 and a second coupling portion 212, respectively. The second coupling portion 212 is larger/wider than the first coupling portion 211. The second coupling portion 212 is positioned radially outside of the first coupling portion 211.

The first coupling portion 211 may also comprise or form a transport lock portion 211a, as has already been discussed regarding the securing elements 10; 110 described above. The securing element 210 is adapted as a sheet-like segment with opposite sliding faces 213 like the securing elements 10; 110 described above, which thus define a supporting portion 217 at least in part. The securing element 210 comprises an engagement portion 215 and a tab 214. Except for the configuration of the coupling portions, the securing elements 10; 110; 210 are similar in design.

In FIG. 9B a variant of the securing element 210 is shown, on which coupling portions are arranged eccentrically. Hereby a securing element 210 comprises a side coding 210a thus it includes a predefined upper side and a predefined lower side. Here, a third coupling portion 218 defines a dismounting position, in which the securing element 210 may be secured during dismounting by engaging the corresponding coupling element with the securing element 210 only partly. Hereto the third coupling portion 218 is formed smaller than the second coupling portion 212. Here, the second and third coupling portions 212, 218 form a recess with a narrow and a broad portion. The latch may only snap-in, if one of two sides (upper or lower side) of the securing element 210 is arranged facing upwards or points to the upper side.

Figure 10A:
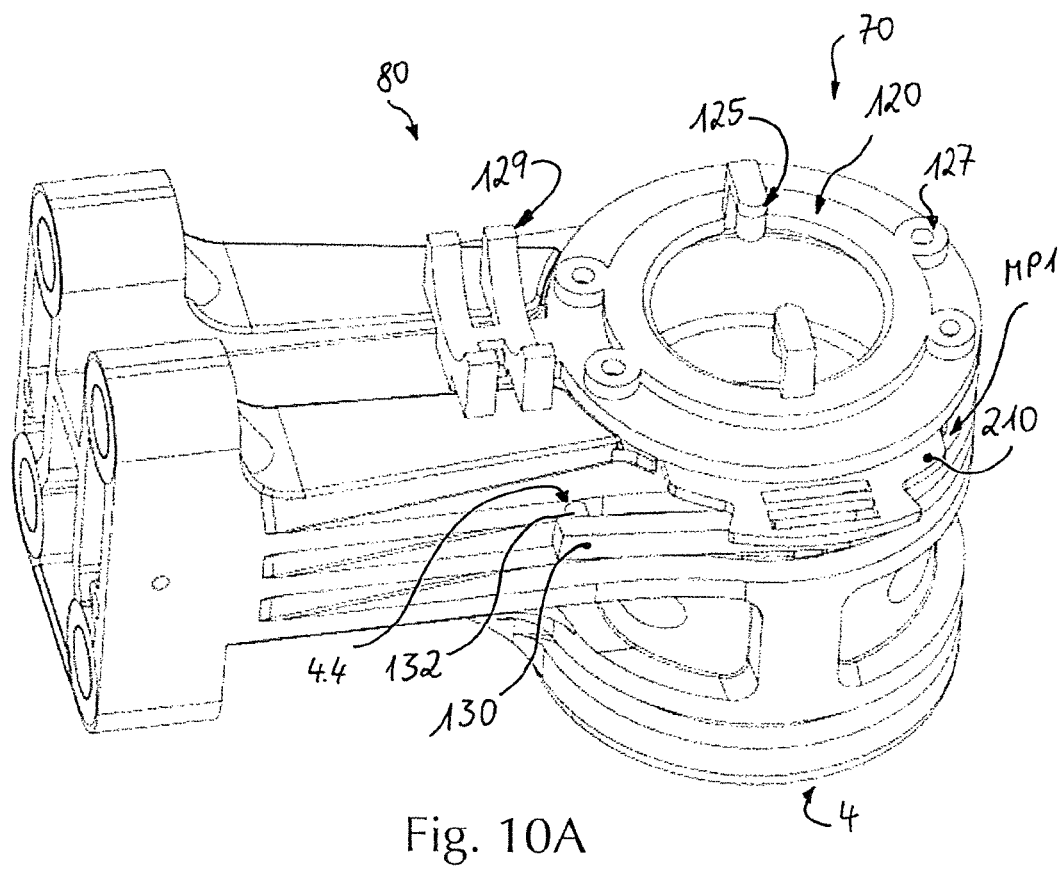
In FIGS. 10A, 10B in a perspective view and a section view components of a mounting set according to a further exemplary embodiment of the invention in a mounting preparation position, in particular the bushing shown in FIG. 1A, 1B, a cover, two couplings elements as shown in FIG. 8, and to securing elements as shown in FIGS. 9A or 9B.
Figure 10B:
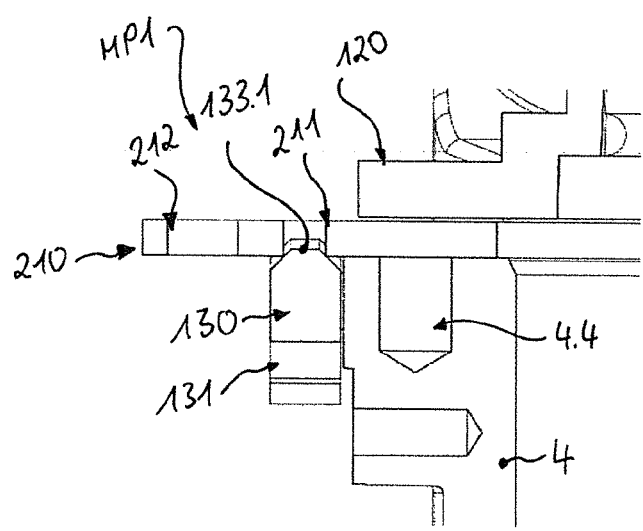

In FIGS. 10A, 10B a bushing 4 is shown with a cover 120 supported thereon, wherein the securing element 210 is supported and held in a mounting preparation position MP1 between the cover 120 and the bushing 4, as has been described above. The cover 120 comprises radial extensions 125, fastening means 127, and a cable retainer 129.

In addition, a latch 130 is pivotably supported on the bushing 4 around an axis of rotation defined by the supporting portion 132 by means of the supporting portion 132 in at least two predefined pivotable positions, in particular in a mounting preparation position (as shown) and in a securing position. Here, the latch 130 may be supported in a biased way, for example by means of a force storage (in particular leg spring), which is not shown in detail, in particular by applying a pressure upwards. Here, the supporting portion 132 may engage with a coupling point 4.4 (e.g., blind-bore, not shown) provided on the bushing 4, which is formed to correspond geometrically to the supporting portion 132.

In FIG. 10A components of a securing system 70 are shown, that is the cover 120, the securing element(s) 210, and the coupling element(s) 130. In addition, components of a mounting set 80, in particular comprising the bushing 4 are shown.

FIG. 10B shows a partial engagement of the latch 130 in the mounting preparation position in a detailed section view. The latch 130 engages with the coupling portion 211 from below. Optionally, the latch 130 may also engage from above, which enables a particular secure and robust configuration of the securing mechanism, in particular regarding interacting gravitational forces.

In case no securing element 2010 is provided, the latch 113 may move further upwards or downwards, as if a securing element is provided. Here, a rip of a casing may not engage with the fastening portion 131 of the securing element 210, thus the casing may not be mounted, as has been explained regarding to FIG. 12A to 12D.

Figure 11A:
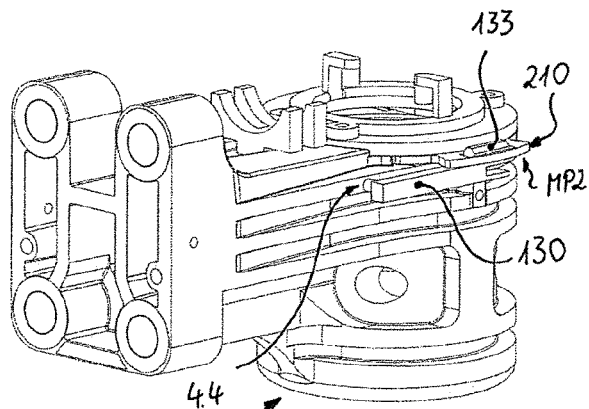
In FIGS. 11A, 11B in a perspective view and a side view the components of the mounting set shown in FIGS. 10A, 10B in a securing position.
Figure 11B:
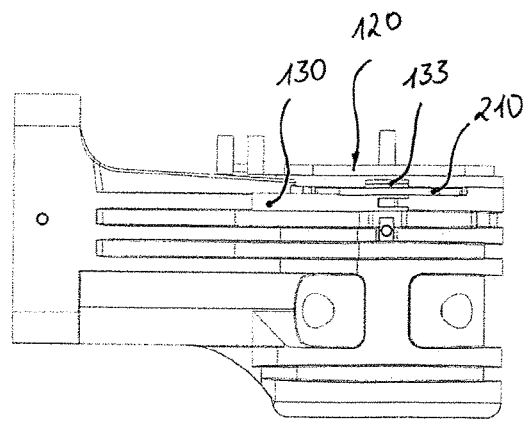
Figure 12A:
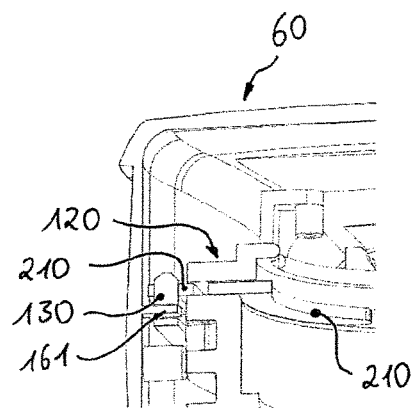
In FIGS. 12A, 12B, 12C, 12D in different perspective section views components of a stand device according to a further exemplary embodiment of the invention, in particular the components shown in FIGS. 10A, 10B, and a casing mounted on the bushing or on the coupling elements; and In FIGS. 13A, 13B in a perspective view and in a plan view, a variant of the cover described above, or the bushing described above, respectively, for a securing element including a coding according to a further exemplary embodiment of the invention.
Figure 12B:
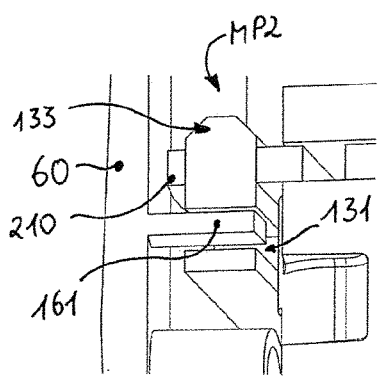
Figure 12C:
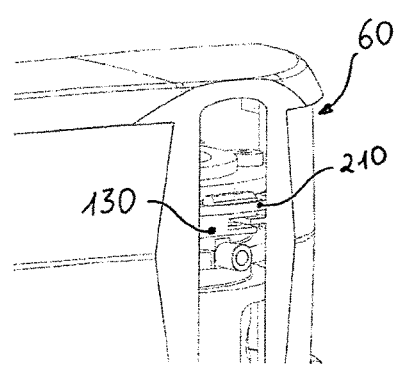
Figure 12D:
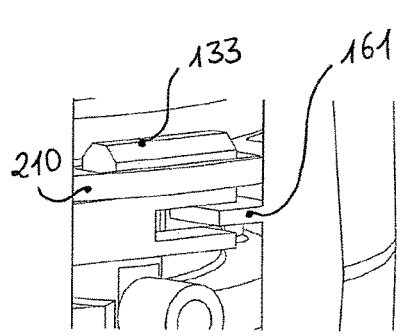

In the FIGS. 11A, 11B an arrangement according to the securing position MP2 is shown. The latch 130 is pivoted upwards and arranged in a manner that the engagement portion 133 fully engages with the second recess of the securing segment 210. The engagement portion 133 protrudes from an upper side of the securing element 210 from the securing segment. In this arrangement a spindle is secured by means of the securing segment 210 in the axial direction, wherein the securing segment is prevented from being displaced radially outwards or inwards. The radial position of the securing element 210 is locked by the latch 130.

In FIGS. 12A, 12B, 12C, 12D is shown how a further securing function may also be provided by means of the latch 130 during final mounting of a casing 60. The securing element 210 and the latch 130 are arranged in the securing position, respectively. The latch 130 is pivoted upwards, thus a fastening portion/gap 131 is arranged in the same height as a fastening means 161 of the casing 60. Only in this securing position the fastening means 161 (rip, crosspiece, protrusion) may engage with the fastening portion 131, thus a mounting of the casing 60 is only possible in this arrangement. Once the casing has been mounted, an additional securement of the latch 130 may be performed by using the fastening means 161. In other words: a finally mounted stand device is also additionally secured by the latch 130 and the casing 60 like in the exemplary embodiment described above. In both exemplary embodiments described above the securing element 10; 110; 210 is secured by axial engagement. The coupling element 30; 130 is also secured by the fact that a relative movement in the axial direction is locked. In other words: by an axial lock of the coupling element, security is increased and/or mounting is facilitated.

Figure 13A:
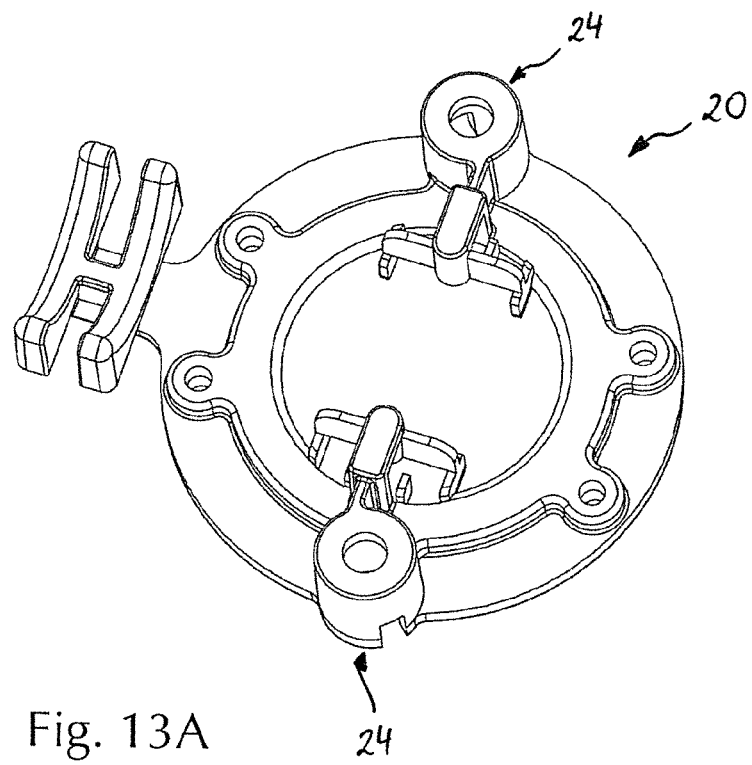
Figure 13B:
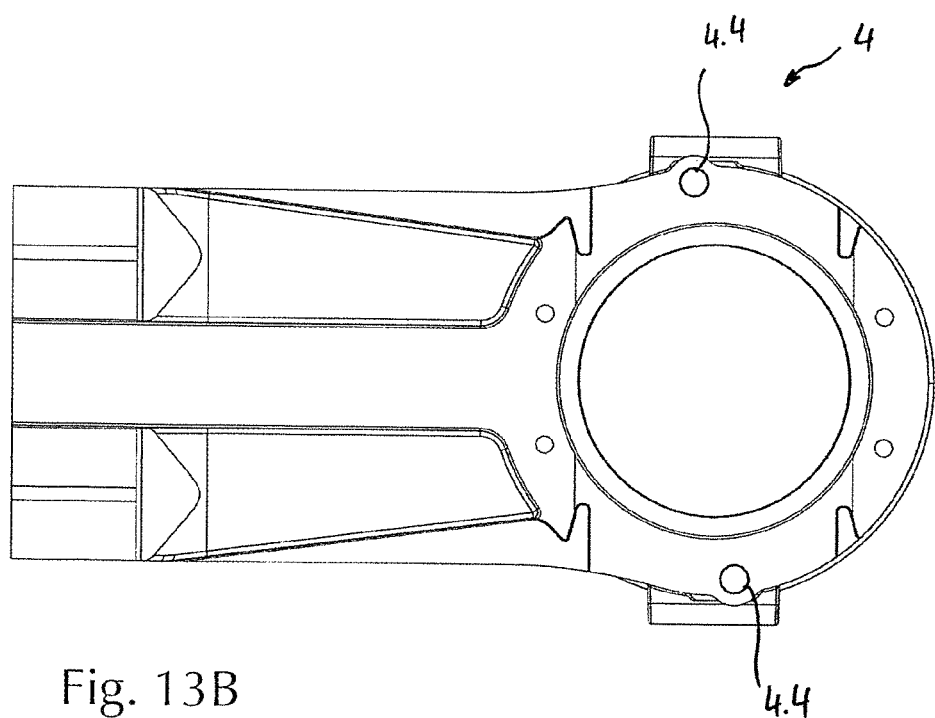

Due to the fastening means 161 it can be prevented that the technician would complete the mounting of the stand device without securing the spindle 3. In this case the securing element 210 would then prevent a displacement of the latch 130 from the mounting preparation position into the securing position. If no securing elements are provided, for example in case they were forgotten, a visual inspection of the position of the locking pin may allow an examination, as explained regarding FIG. 6B or FIG. 10B. p In FIGS. 13A and 13B a variant of the cover 20 described above or of the bushing 4 described above is shown for a securing element including a coding. The retainers 24 are arranged with an eccentricity or an offset in the peripheral direction corresponding to an eccentricity of the coupling portions of the corresponding securing element. The coupling points 4.4 are arranged accordingly.

LIST OF REFERENCE NUMBERS

1 Stand device, in particular ceiling stand device
3 Pin (for example, for a monitor or carrier arm pin) or (hollow) spindle
3.1 Engagement portion on pin/spindle, in particular peripheral groove
4 Supporting apparatus, in particular bushing to support a carrier arm or a medical device
4.1 Cutout, milled recess, milled cut or contour of a form
4.2 Supporting portion, in particular with at least a supporting surface
4.2a Step or guiding edge
4.3 Contact surface for cover
4.4 Coupling point, in particular bore
4.5 Fastening means, in particular threaded-bore
4.6 Inner lateral surface
4.7 Mounting portion, in particular with through-bores
5 Carrier arm or spring arm
7 Rotary joint or rotary bearing
7.1 Single supporting element, in particular roller bearing or ball bearing
10; 110; 210 Fastening element, in particular securing segment
10A; 210a Coding, in particular asymmetrical portion of the securing element, in particular side-oriented "coding"
11; 111; 211 First coupling portion or coupling point (for example recess), in particular smaller than the coupling element (diameter)
11a; 111a; 211a Transport lock portion
12; 112; 212 Second coupling portion or coupling point (for example recess), in particular equal to or larger than the coupling element (diameter)
13; 113; 123 Sliding surface, sliding surface portion or sliding layer of the securing element
14; 114; 214 Tab, in particular gripping tab configured for manual operation
15; 115; 215 Engagement portion, in particular arc surface portion or concave curvature portion
16 Further recess for mounting purposes, in particular corresponding to tool geometry
17; 117; 217 Supporting portion, in particular comprising opposite surface portions
18; 218 Third coupling portion or coupling point (for example recess), in particular in the size of the coupling element (diameter)
19 Dismounting slot
20; 120 Cover, in particular cover ring
21 At least sectionwise planar lower side, in particular contact surface and/or supporting surface
21a Supporting surface, in particular planar sliding surface portion
21b Contact surface portion
24 Retainer, in particular cup or mandrel
24.1 Step
25; 125 Radial extension
27; 127 Fastening means
29; 129 Cable retainer or cable support portion
30; 130 Coupling element, in particular locking pin or hook, latch
31; 131 Fastening portion, particularly fastening portion corresponding to fastening means on the casing, in particular groove or recess, preferably slot or peripheral groove in a predefined (axial) height
32 Ring portion of the locking pin
32.1 Upper contact surface
132 Support portion, in particular bolt or pin
33; 133 Engagement portion, in particular corresponding to the coupling portion of the securing element
33.1 Free end, in particular chamfer
50 Force storage (for example helical spring or leg spring), for example supported in an elastically biased way on the cover or on the bushing
60 Casing
60a First half of casing
60b Second half of casing
61; 161 Fastening means, for example rip on/in the casing, in particular a fastening means arranged at a predefined height position
70 Securing system
80 Mounting set
b133 Width of the engagement portion b133.1 Width of the front face of the engagement portion
d12; d112 Diameter of the second coupling portion
D30 Diameter of the coupling element on an upper free or an operation portion
d33 Diameter of the engagement portion
d33.1 Diameter of a free end, in particular a chamfer of the engagement portion
D Axis of rotation, in particular vertically aligned vertical height axis
h30 Predefined height of the locking pin in relation to the bushing
h31 Height of the groove of the locking pin
K 24 Cavity to accommodate a coupling element
M Central longitudinal axis of the securing element, in particular centered in relation to a width of an axis arranged in the peripheral direction
MP1 Mounting preparation position
MP2 Secured position for operation
R1, R2 Radius of the securing segment, in particular corresponding to the mandrel geometry
RK Ring cavity to accommodate a force storage/spring element The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A securing system for axial positioning and securing of a spindle or a pin on a bushing in a rotary joint of a medical stand device, comprising:
   at least one securing element;
   the bushing forming a support for the securing element;
   a cover coupleable with the bushing, the bushing comprising a contact surface on an upper side that is formed to correspond geometrically to a lower side of the cover at least sections;
   at least one coupling element supportable on the cover and/or on the bushing and formed to correspond geometrically to at least one coupling portion of the securing element for the purpose of form-fitting;
   the cover comprising a supporting portion formed to correspond geometrically to a supporting portion of the securing element and adapted to guide the securing element in the radial direction to position and hold it in the axial direction in a predefined axial position; and
   the securing element comprising a supporting portion configured to arrange the securing element in a predefined axial position on a supporting apparatus of the stand device, and an engagement portion configured to interact with the spindle or the pin of the stand device that is rotatably supportable around an axis of rotation in a supporting apparatus to secure the spindle or the pin rotatably in the predefined axial position relative to the supporting apparatus within the supporting apparatus;
   wherein the securing element is configured to be supported in at least one radial position predefined by the securing element on the supporting apparatus, such as a mounting preparation position or a securing position, wherein the engagement portion is adapted to interact with the spindle or the pin by engagement in the radial direction.

2. The securing system according to claim 1, wherein the securing element comprises at least one coupling section which defines at least one of the predefined radial positions.

3. The securing system according to claim 1, wherein the securing element comprises a coupling portion formed as a first recess, which defines the mounting preparation position or wherein the securing element comprises a coupling portion formed as a second recess which defines the securing position.

4. The securing system according to claim 1, wherein the securing element comprises at least one coupling portion arranged eccentrically in relation to a central longitudinal axis of the securing element or in relation to an extension of the securing element in the peripheral direction.

5. The securing system according to claim 1, wherein the securing element comprises a lower side and an upper side which are formed substantially geometrically identical to each other.

6. A cover for a supporting apparatus of a medical stand device for arrangement in the operating room, wherein the cover comprises a supporting portion configured to arrange and hold a securing element in a predefined axial position on the cover and is configured to guide the securing element in the axial position in the radial direction;
   the securing element comprising a supporting portion configured to arrange the securing element in a predefined axial position on a supporting apparatus of the stand device, and an engagement portion configured to interact with a spindle or a pin of the stand device that is rotatably supportable around an axis of rotation in a supporting apparatus to secure the spindle or the pin rotatably in the predefined axial position relative to the supporting apparatus within the supporting apparatus; and wherein the securing element is configured to be supported in at least one radial position predefined by the securing element on the supporting apparatus, such as a mounting preparation position or a securing position, wherein the engagement portion is adapted to interact with the spindle or the pin by engagement in the radial direction.

7. The securing system according to claim 1, further comprising a self-securing securing mechanism by means of the coupling element and the securing element, wherein the securing mechanism of the securing element is lockable in the axial direction in a predefined radial position by form-fitting.

8. A bushing for a medical stand device, wherein the bushing defines an axis of rotation for a rotational movement of a spindle or a pin of the stand device, wherein the bushing comprises a supporting portion configured to arrange and axially hold a securing element in a predefined axial position on the bushing, and is configured to guide the securing element in the radial direction at least approximately orthogonal to the axis of rotation, wherein the bushing comprises a coupling portion, wherein a coupling element that is coupable with the securing element is supportable in order to secure the securing element; the securing element comprising a supporting portion configured to arrange the securing element in a predefined axial position on a supporting apparatus of the stand device, and an engagement portion configured to interact with the spindle or the pin of the stand device that is rotatably supportable around an axis of rotation in a supporting apparatus to secure the spindle or the pin rotatably in the predefined axial position relative to the supporting apparatus within the supporting apparatus; and wherein the securing element is configured to be supported in at least one radial position predefined by the securing element on the supporting apparatus, such as a mounting preparation position or a securing position, wherein the engagement portion is adapted to interact with the spindle or the pin by engagement in the radial direction.

9. The bushing according to claim 8, wherein the bushing is configured to form a support together with a cover for the securing element.

10. A mounting set for a medical stand device configured for arrangement in the operating room and for positioning of a medical device, the mounting set comprising at least one supporting apparatus comprising a bushing according to claim 9, at least one securing element, and at least a coupling element, wherein the supporting apparatus comprises a supporting portion configured to arrange and hold the securing element axially in a predefined axial position on the supporting apparatus, wherein at least the securing element and the coupling element are configured to interact with one another for defining at least one, radial position of the securing element in relation to the supporting apparatus by an at least form-fitting engagement into each other.

11. A medical stand device for arrangement in the operating room and including a securing element for positioning a medical device, the securing element comprising:
a supporting portion operable to arrange the securing element in a predefined axial position on a bushing to guide the securing element in the radial direction at least approximately orthogonal to an axis of rotation, the bushing having a coupling portion in which a coupling element that is coupable with the securing element is supportable in order to secure the securing element; and
an engagement portion operable to interact with a spindle or a pin of the stand device that is rotatably supportable around the axis of rotation in a supporting apparatus to secure the spindle or the pin rotatably in the predefined axial position relative to the supporting apparatus within the supporting apparatus;
the securing element being supportable in at least two radial positions predefined by the securing element on the supporting apparatus, the at least two radial positions including a mounting preparation position and a securing position, in which the engagement portion is adapted to interact with the spindle or the pin by engagement in the radial direction;
whereby the spindle and/or the pin are secured by means of the securing element in the predefined axial position in relation to the bushing, and whereby the securing element is secured in a predefined radial position by means of at least one coupling element supported on the bushing and/or coupling element supported on a cover mounted on the bushing, which engages with the securing element in a form-fitting way in the axial direction;
the cover comprising a supporting portion adapted to arrange and hold the securing element on the cover in a predefined axial position and being operable to guide the securing element in the axial position in the radial direction; and
the bushing being operable to form a support for the securing element with the cover, the bushing comprising a contact surface on an upper side, at least a portion of which is formed to correspond geometrically to a lower side of the cover.

12. The medical stand device according to claim 11, wherein the supporting portion is adapted to arrange and hold the securing element on the lower side of the cover.

13. Use of a securing element on a bushing to secure a spindle or a pin in a predefined axial position on the bushing, on a medical stand device configured for arrangement in the operating room, in particular a securing element, wherein the securing element is supportable in a predefined axial position on the bushing in at least one radial position that may be predefined by using the securing element, and is arranged in the at least one radial position in such a manner that the securing element engages with the spindle or pin in the radial direction and secures the spindle or the pin in the axial direction in relation to the bushing; the securing element comprising a supporting portion configured to arrange the securing element in a predefined axial position on a supporting apparatus of the stand device, and an engagement portion configured to interact with the spindle or the pin of the stand device that is rotatably supportable around an axis of rotation in a supporting apparatus to secure the spindle or the pin rotatably in the predefined axial position relative to the supporting apparatus within the supporting apparatus.

14. Use of a securing element on a bushing as a transport lock and arranged in a predefined radial position, for a medical stand device configured for arrangement in the operating room, wherein the securing element is arranged on the bushing in a predefined radial position in such a manner that the securing element does not project beyond the bushing inwards in the radial direction or does not project further than a diameter of a spindle or pin arrangeable in the bushing, wherein the securing element is secured in the radial position by means of a coupling element; the securing element comprising a supporting portion configured to arrange the securing element in a predefined axial position on a supporting apparatus of the stand device, and an engagement portion configured to interact with the spindle or the pin of the stand device that is rotatably supportable around an axis of rotation in a supporting apparatus to secure the spindle or the pin rotatably in the predefined axial position relative to the supporting apparatus within the supporting apparatus; and wherein the securing element is configured to be supported in at least one radial position predefined by the securing element on the supporting apparatus, such as a mounting preparation position or a securing position, wherein the engagement portion is adapted to interact with the spindle or the pin by engagement in the radial direction.

15. Use of a securing element in mounting/dismounting of a stand device configured for arrangement in the operating room, in particular the securing element according to the securing system of claim 1 regarding a securing element, wherein the securing element is positioned sequentially in at least two different predefined radial positions on a bushing of the stand device, and is secured in the respective radial position.

16. The securing system of claim 1 wherein the supporting apparatus comprises the bushing.

17. The securing system of claim 1 wherein the securing element is configured to be supported in at least two radial positions predefined by the securing element on the supporting apparatus, namely, in at least the mounting preparation position and the securing position.

18. The securing system of claim 1 wherein the engagement portion is adapted to interact with the spindle or the pin by engagement in the radial direction at least when the securing element is in the securing position.

19. The securing system according to claim 2, wherein the securing element comprises at least two coupling sections.

20. The securing system of claim 3, comprising both a first recess and a second recess and wherein the first recess is larger than the second recess.

21. The securing system of claim 5, wherein the securing element is formed in the shape of one of a plate, a disk and an annular segment.

22. The securing system of claim 21, wherein the securing element is formed in the shape of an annular segment with upper and lower sides that are aligned parallel to each other.

23. The securing system of claim 6, wherein the supporting portion is configured to hold the securing element on a lower side of the cover.

24. The securing system of claim 7, wherein the securing mechanism is self-securing due to an elastically biasable arrangement of the coupling element.

25. The securing system of claim 7, wherein the securing mechanism of the securing element is lockable in the axial direction in the securing position.

26. A mounting set according to claim 10 wherein at least the securing element and the coupling element are configured to interact with one another for defining at least two radial positions of the securing element in relation to the supporting apparatus.

27. A mounting set according to claim 26 wherein the at least two radial positions of the securing element in relation to the supporting apparatus include the mounting preparation position and the securing position.

28. A mounting set for a medical stand device configured for arrangement in the operating room and for positioning of a medical device, comprising at least one supporting apparatus, at least one securing element from the securing system according to claim 1, and at least a coupling element, wherein the supporting apparatus comprises a supporting portion configured to arrange and hold the securing element axially in a predefined axial position on the supporting apparatus, wherein at least the securing element and the coupling element are configured to interact with one another for defining at least one radial position of the securing element in relation to the supporting apparatus by an at least form-fitting engagement into each other.

29. A mounting set according to claim 28 wherein at least the securing element and the coupling element are configured to interact with one another for defining at least two radial positions of the securing element in relation to the supporting apparatus.

30. A mounting set according to claim 29 wherein the at least two radial positions of the securing element in relation to the supporting apparatus include the mounting preparation position and the securing position.

31. Use of a securing element according to claim 14 wherein the securing element is secured in the radial position by means of a coupling element that is supported in an elastically biased way by engagement in the axial direction.

32. Use of a securing element according to claim 15, wherein the securing element is positioned during mounting initially in a mounting preparation position disposed radially further outwards, and then in a securing position disposed radially further inwards.

33. Use of a securing element according to claim 15, wherein the securing element is positioned during dismounting initially in an inverted arrangement in the securing position and then in the mounting preparation position.

34. The bushing according to claim 9, wherein the bushing comprises a contact surface on an upper side that is formed to correspond geometrically to a lower side of the cover at least in sections.

* * * * *